United States Patent Office 2,781,269
Patented Feb. 12, 1957

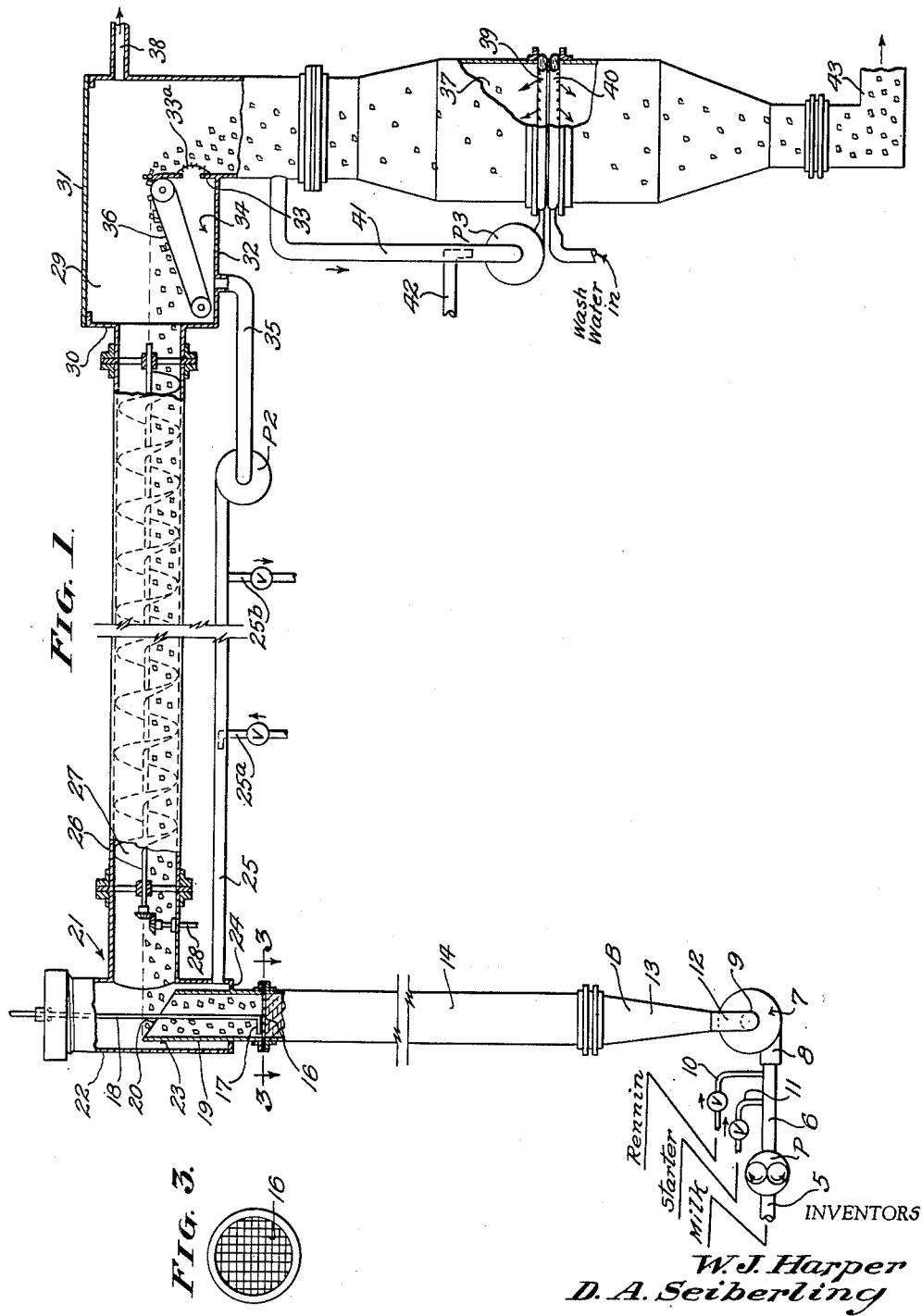

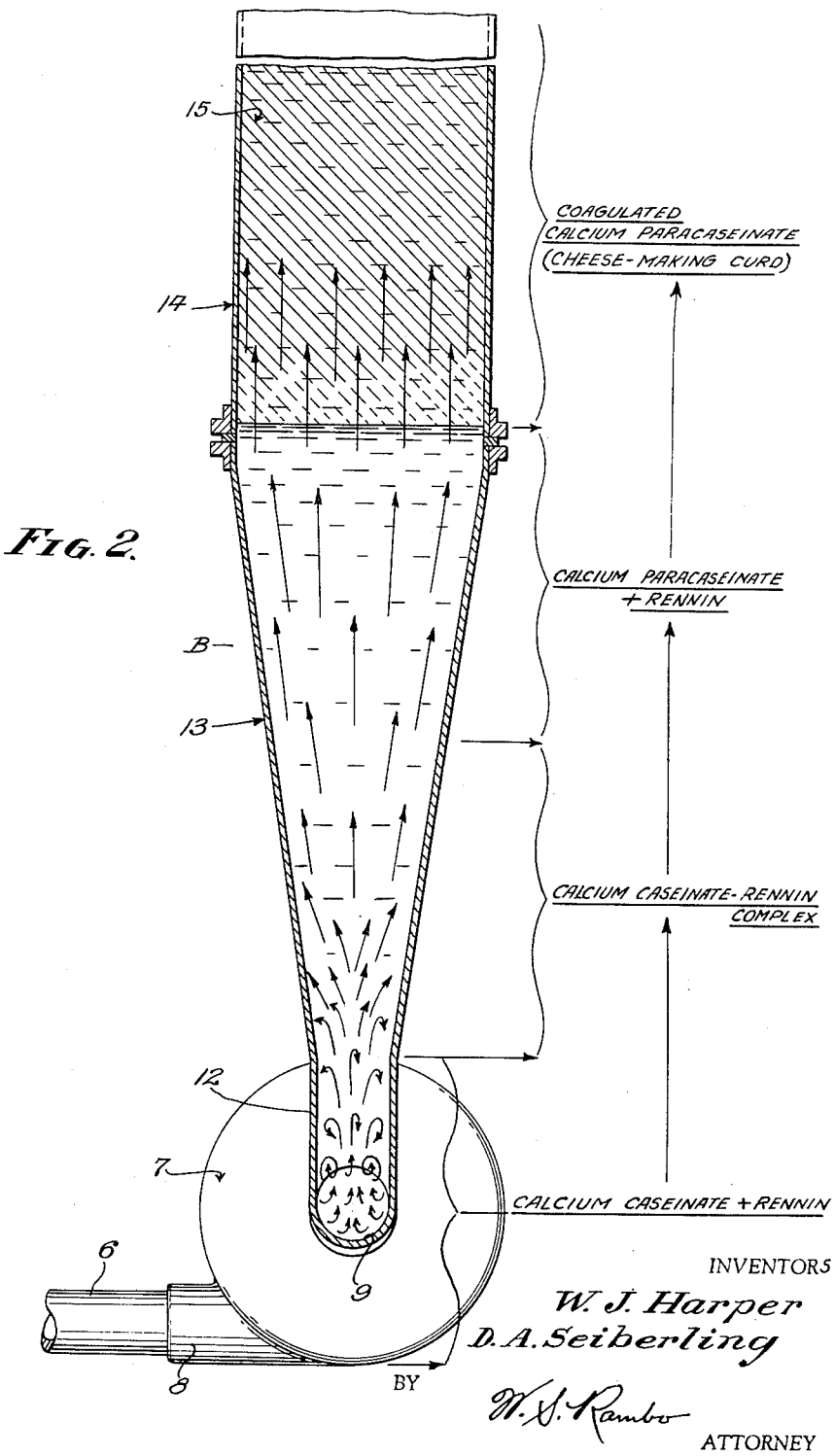

2,781,269

METHOD AND APPARATUS FOR THE CONTINUOUS PRODUCTION OF CHEESE-FORMING CURD

Willis J. Harper and Dale A. Seiberling, Columbus, Ohio, assignors, by mesne assignments, to The Ohio State University Research Foundation, Columbus, Ohio, a corporation of Ohio Application June 30, 1955, Serial No. 519,048

9 Claims. (Cl. 99—116)

The present invention relates to the art of cheese making and has for its primary objective the provision of an efficient method and apparatus for the continuous manufacture of cheese-forming coagulum or curd.

In the past, in the manufacture of substantially all varieties and types of cheese, it has been the accepted practice to first form a cheese-making curd-coagulum through the chemical coagulation of milk or milk derivatives involving the addition to a given batch of such milk or milk derivatives of the enzyme, rennin, and a suitable starter in the form of a bacterial culture which functions to produce acid which is essential to the formation of proper cheese body and which functions to stimulate and control the desired bacterial growth within or upon the particular cheese. Generally speaking, the basic step involved in any cheese-making operation or method is the formation of coagulated calcium paracaseinate from a substantially quiescent batch of the selected basic milk food ingredient or ingredients.

The general reaction which takes place in the chemical coagulation of milk or milk derivatives, such as cream, skim milk, buttermilk, etc., which contain calcium caseinate, may be expressed as follows:

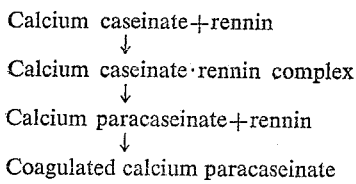

Accepted theory and evidence indicate that the rennin coagulation of casein is essentially a two-stage reaction in which the formation of uncoagulated paracasein is accompanied by some hydrolytic cleavage of amino acids from the molecule, as well as the splitting of certain phosphate bonds, and in which the second stage is the actual coagulation of the paracasein. It is believed that after cleavage of certain bonds in the casein, paracasein forms, and a molecular rearrangement takes place which results in the coagulation of the paracasein. The presence of calcium ions is essential in this last-mentioned step.

Heretofore, it has been shown that if any substantial agitation or vibration within the reaction mixture occurs during the overall coagulation reaction, a firm curd, which is essential for subsequent cheese-making operations, does not form, and the reaction mixture must be discarded. Hence, due to this prohibition against agitation or vibration during the coagulation reaction, so far as we are aware, no previous attempts have been made toward the formation of cheese-making curd in a continuously moving body or column of the reaction mixture comprising the basic casein-containing milk food ingredient and the enzyme rennin.

It follows, therefore, that the foremost object of our invention is to provide a method and means for making cheese-forming curd in a substantially continuous operation, wherein the cheese-forming curd is formed in a continuously moving body or column consisting of the basic milk food ingredient, rennin, and a starter.

It is another object of the present invention to provide an efficient, expeditious, and readily operable method of forming cheese-making curd through the chemical coagulation of a given liquid milk food ingredient while such ingredient is maintained in a state of motion relative to associated processing apparatus, and thereby to provide for the continuous production of such cheese-making curd as contrasted to the usual batch methods employed heretofore in the production of cheese-forming curd.

A further object of the invention is to provide a relatively structurally simple and inexpensive apparatus in which cheese-forming curd may be produced in a continuous operation.

Yet another object of this invention is to provide a method and means whereby the time, labor, and costs heretofore involved in the so-called "batch" production of cheese-forming curd may be materially reduced, with consequent savings in the overall costs of producing a given cheese.

For a further and more complete understanding of the present invention, reference is made to the following description and the accompanying drawings, wherein:

Fig. 1 is a diagrammatic view of a continuous curd producing apparatus formed in accordance with the present invention;

Fig. 2 is an enlarged diagrammatic vertical sectional view taken through the chemical reaction and coagulation chambers of the present apparatus and showing the non-turbulent, substantially viscous flow or movement of the curd-forming ingredients during the final coagulation stage of reaction.

Fig. 3 is a horizontal sectional view taken along the line 3—3 of Fig. 1.

In accordance with the method of the present invention, a continuously moving, preheated stream of fluid whole milk, preferably cow milk, or a casein-containing derivative of whole milk, such as cream, skim milk, butter milk, reconstituted or liquefied powdered whole milk or skim milk, or mixtures thereof, is provided and has introduced therein metered quantities of rennin and a suitable bacterial starter, such as a solution, emulsion, or suspension containing a culture of *Streptococcus lactis, Streptococcus thermophilus, Lactobacillus lactis,* or *Lactobacillus bulgaricus.* Following the introduction of rennin and starter to the stream of the casein-containing milk food ingredient or mixture, the stream is subjected to relatively high-speed and violent agitation and mixing to insure substantially homogeneous dispersion of the rennin and starter throughout the stream of the casein-containing milk food ingredient. Next, the stream, containing the mixed milk food ingredient, rennin, and starter, is caused to assume a relatively quiescent or non-turbulent state, while at the same time moving in a confined column, during which period the second or last stage of the chemical coagulation reaction takes place to transform the initially liquid column or stream into a column of soft but firm cheese-making curd. It is important that the column or stream of liquid, during the coagulation period, be maintained substantially free of internal turbulence and eddy currents, in order that a firm curd structure may be formed therein in spite of the continuous movement thereof as a body through an associated conduit or coagulation chamber, and this is accomplished by causing the stream, after the same passes the agitating or mixing zone, to expand gradually in diameter or width and thereby dampen and arrest any material currents and turbulence therein just prior to the coagulation point of the casein-rennin mixture.

Following transformation of the liquid stream to a viscous coagulated column, the same passes into contact with suitable curd-cutting knives so as to divide the curd column into relatively small particles of desired uniform size, and such curd particles may then, for example, be passed in heated whey continuously through a precooking zone or chamber and thence separated from the whey and passed through a final cooking zone, washed, cooled, and then discharged into suitable hoops or cheese-making forms for final pressing, salt treatment, curing, and aging in accordance with standard cheese-making procedures.

With reference to the drawings, Fig. 1 illustrates diagrammatically one form of apparatus which is employed in the continuous production of cheese-forming curd in accordance with this invention. In Fig. 1, the reference numeral 5 designates the inlet of a positive displacement hydraulic pump P, the inlet 5 being connected with a reservoir or other suitable source of supply of the influent, casein-containing milk food ingredient, not shown. Also, the inlet 5 may have associated therewith a suitable preheating device, not shown, by which the temperature of the influent milk food ingredient may be uniformly regulated. The outlet or discharge side of the pump P is connected with a suitable, power-driven agitator or mixer 7. It has been found in practice that the agitator or mixer 7 may, advantageously, take the form of a flat-bladed, centrifugal pump arranged so as to receive the influent liquid at the normal, tangentially disposed outlet 8 thereof and to discharge the influent liquid, after high speed agitation and circulation thereof within its impeller chamber, outwardly from its normal, axially disposed inlet 9. It will be understood that while we have found that a centrifugal-type pump arranged as aforesaid operates efficiently as a high speed agitator or mixer, the same may, if desired, be replaced with any equivalent device or apparatus, such as a homogenizer, which functions to produce substantially violent agitation and mixing of the influent liquid passed therethrough under pressure of the positive displacement pump P.

Communicating with the conduit 6, between the pump P and the agitator or mixer 7, are a pair of relatively smaller pilot conduits or lines 10 and 11 which communicate, respectively, with supply sources of rennin and a bacterial starter, such as *Streptococcus lactis*, not shown. The feed conduits 10 and 11 are provided with adjustable metering valves or pumps V, whereby the flow of the rennin and the starter, in liquid form, to the conduit 6 may be controlled to insure the introduction of proper proportions of rennin and starter to the stream of influent, casein-containing liquid passing from the pump P. Preferably, the valves V should be adjusted so as to introduce from 3 to 10 ounces of rennin and 0.25 to 10.0 percent by volume of starter per thousand pounds of the influent, casein-containing liquid displaced by the pump P. The agitator or mixer 7 then functions to thoroughly mix the rennin and starter with the influent, casein-containing liquid as the same pass therethrough to insure even and homogeneous dispersion of rennin and starter throughout the liquid. The action of the mixer or agitator 7 is believed to greatly accelerate the first stage or step in the chemical coagulation reaction.

Connected to receive the liquid discharged from the mixer or agitator 7 is the lower smaller end portion 12 of a vertically arranged, gradually tapered conduit or hollow reaction zone 13. The larger upper end of the tapered conduit 13 is joined with the lower end of an elongated, vertically arranged tube or conduit 14 which defines therein a uniformly cylindrical coagulation chamber 15. Preferably, the inner wall surfaces of the tapered conduit 13 and the conduit 14 are finished to a high degree of smoothness so as to minimize friction between such inner wall surfaces and the column of liquid and/or coagulum passing therethrough, and thus eliminate, as nearly as possible, the creation of turbulence or eddy currents within the column of liquid and/or coagulum during the coagulation reaction. Toward this end, the conduits 13 and 14 may be formed from glass, metal, metal alloy, or a suitable synthetic resin having a highly polished and smooth interior wall surface, and resistance to chemical attack by the materials conducted therethrough.

As shown in the drawings, the conduit or cone 13 is formed so as to have a progressively increasing diameter from the lower to the upper end thereof, in order that the stream of liquid discharged from the mixer or agitator 7 may expand gradually and slow in its longitudinal movement sufficiently to damp substantially all turbulence therein by the time the stream reaches the lower end of the coagulation chamber 15, at which time the stream of liquid assumes the form of a substantially quiescent, relatively non-mobile column which may move as a body in substantially viscous flow upwardly of the conduit 14.

The fluid-displacing capacity of the pump P and the dimensions of the conduits 6 and 13 are such that the maximum time required for a given point in the stream of influent liquid to pass from the outlets of the rennin and starter-introducing conduits 10 and 11 to the lower end portion of the coagulation chamber 15 is approximately two minutes, during which interval the initial or first stage of the chemical coagulation reaction takes place. By the time the stream or column of liquid leaves the upper end of the reaction cone or conduit B, turbulence has ceased and a substantially viscous or columnar flow upwardly of the coagulation chamber 15 is in progress. It is at substantially this time that the second stage of the coagulation reaction begins, wherein the uncoagulated paracaseinate is transformed into coagulated paracaseinate and the initially liquid stream or column becomes a longitudinally moving plug or column of curd-coagulum. Depending upon the temperature of the mixture of milk, starter, and rennin, the type of cheese desired, and the rate of flow of the mixture through the reaction chamber, the time required for the completion of the coagulation reaction generally ranges from five to twenty minutes, and the dimensions of the conduit 14 are predetermined with respect to the volumetric capacity of the pump P, so that the time required for a given point in the curd-forming column to travel substantially from the lower end of the conduit 14 to the upper end thereof is at least sufficient to permit completion of the coagulation reaction and the attainment of a desired curd structure prior to passage of the curd column outwardly from the top of the chamber 15.

The upper end of the conduit 14 is provided with a transversely extending cutting grid 16 made up of a plurality of perpendicularly disposed wires forming therebetween a multiplicity of rectangular or square openings. The cutting grid 16 functions upon progressive movement of the curd column longitudinally outwardly from the upper end of the conduit 14 to cut or divide the column longitudinally into a multiplicity of separate smaller columns. The grid 16 is of an interchangeable construction in order that different sizes of grids may be employed so as to selectively control the sizes of the columns cut thereby. Located substantially immediately above the grid 16 is a rotary, radially disposed knife 17 which is carried upon a driven shaft 18 extending exteriorly and coaxially of an extension conduit 19 forming a longitudinal continuation of the conduit 14. The knife 17 is rotated constantly to sever or cut the separate smaller columns of curd transversely so as to form a multiplicity of individual, substantially cubical curd particles.

It will be understood that the curd or coagulum formed as a result of the coagulation reaction in the chamber 15 does not provide a completely solid or semi-solid column, but is more nearly characterized as a column of semi-solid and liquid composition, consisting of the curd-coagulum and liquid whey. Thus, after cutting of the column by the passage thereof through the grid 16 and the knife 17, the individual curd particles are entrained in the liquid whey. Preferably, the upper end of the extension conduit 19 is formed with an obliquely disposed outlet 20 arranged in registry with one end of the horizontally disposed branch of a T-shaped outer casing or fitting 21 which is also formed or provided with a vertically arranged branch 22 of larger diameter than the outlet or extension conduit 19. The internal diameter of the vertical branch 22 of the T-shaped fitting 21 is such as to provide an annular chamber or space 23 around the extension conduit 19. The lower end of the vertically arranged branch 22 is provided with a suitable sealing ring 24 which receives and supports the extension conduit 19 in its desired coaxial relation to the vertical branch 22. Communicating with the vertical branch 22 between the sealing ring 24 and the outlet 20 of the extension conduit 19 is one end of a smaller return or recirculation conduit 25 through which heated whey is introduced under pressure of a pump P2 into the annular chamber 23 of the T-fitting 21 to circulate and carry the curd particles and whey discharged from the outlet 20 of the extension conduit 19 horizontally and laterally through the horizontal branch of the T-fitting 21 and an elongated, horizontally disposed, precooking, cooking, or curd-transferring conduit 26 communicating with said fitting. Preferably, the conduit 26 is provided with a screw or auger-type conveyor 27 which is driven through a shaft 28 extending exteriorly through the walls of the T-fitting 21, so as to positively advance the whey and entrained curd particles longitudinally through the conduit 26. The end of the precooking conduit 26 opposite the T-fitting 21 communicates with a separator chamber 29 formed by a box-like casing 30 provided with a removable sealing cover 31. The bottom wall 32 of the casing 30 is disposed below the level of the conduit 26, and the casing is provided internally with a transversely extending, vertically arranged weir 33 which defines in the chamber 29 a lower, whey-collecting sump 34.

Connected with the sump 34 is one end of an inlet conduit 35 whose opposite end communicates with the inlet of the whey-recirculating pump P2. The outlet of the pump P2 is, as before stated, connected with the recirculating conduit 25, and the latter is provided with a steam supply pipe 25a through which steam may be injected into the liquid whey being recirculated from the sump 34 to the annular chamber 23 and through the conduit 26 to heat the whey and curd particles entrained therein, so as to maintain a desired temperature in the liquid whey passing through the conduit 26. The temperature within the conduit 26 is regulated in accordance with the particular variety or type of cheese being made, and the particular use to which the conduit 26 is to be put, that is, whether the conduit is being used as a precooker, a final cooker, or merely as a curd-transfer device. The conduit 25 is also provided with a valve-controlled bleed-off line 25b through which surplus or excess liquid whey may be removed from the system so as to maintain a desired level and concentration of liquids within the conduit 26 and sump 34. Positioned within the sump portion 34 of the separator chamber 29 is an inclined, driven, belt-type conveyor or elevator 36. The elevator 36 at its lower receiving end extends transversely of the sump portion of the separator chamber below the discharge end of the conduit 26 and is arranged to receive thereon the solid curd particles discharged into the separator chamber and to elevate such particles above the level of liquid whey and to discharge the same into the upper end of an elongated, vertically arranged chamber 37 which may serve either as a final cooking chamber, a washing chamber, or a combination of both. If desired, the separator casing 30 may be provided with an outlet 38 communicating substantially with the upper level of the chamber 29 and arranged to be connected with a vacuum pump, not shown, whereby reduced, sub-atmospheric pressures may be established in the separator and cooking and washing chambers 29 and 37 and the upper regions of the conduit 26.

Positioned in the intermediate, diametrically enlarged region of the cooking and washing chamber 37 are a pair of vertically superposed, horizontally arranged, annular water spray rings 39 and 40 having relatively small discharge orifices arranged, respectively, to direct upwardly and downwardly convergent streams of water into the chamber 37, in order that the curd particles discharged from the elevator 36 and falling downwardly by gravity through the chamber 37 must pass through the substantially conical spray patterns produced by the rings 39 and 40. The first or upper spray ring 39 is supplied with warm water at a desired temperature by a pump P3 having an inlet conduit 41 communicating with the outlet of the separator chamber 29 below the weir 33 to receive the portion of the liquid whey which overflows from the weir 33 through a screen 33a and trickles down the inner side walls of the outlet of the separator casing 30. Also communicating with the inlet conduit 41 for the pump P3 is a water supply pipe 42 arranged to supply hot, fresh water to the pump P3 for discharge through the spray ring 39. The heat derived from the hot water discharged from the spray ring 39 heats the upper portion of the cooking and washing chamber and the curd particles as the latter fall through the upper portion of the chamber 37 and thus completes the "cooking" of the curd particles. As the curd particles fall downwardly through the upwardly directed stream discharged from the ring 39 and the downwardly directed stream discharged from the ring 40, they are effectively washed, and the washed curd particles, wash water, and a small amount of liquid whey are discharged from the lower end of the chamber 37 through an elbow outlet 43, from whence the curd particles may be separated from the wash water by any suitable means, not shown, and placed in suitable hoops or forms where the same undergo subsequent and standard pressing, curing, and aging procedures to form the desired final cheeses.

In view of the foregoing, it will be seen that the present invention provides a novel and efficient method and apparatus for the continuous production of cheese-making curd, wherein the basic cheese-making milk food ingredient or ingredients under regulated temperatures, rennin, and starter are fed, mixed, and coagulated during continuous movement thereof and the resultant curd-coagulum cut, separated from the whey, cooked, and washed in a continuous manner to prepare the same for final pressing, curing, and aging procedures, which latter procedures may be carried out through the use of standard and well known apparatus and techniques to produce the desired finally cured cheese.

While we have disclosed a single preferred form of apparatus employed in practicing the present invention, it will be understood that the same may be subject to certain modifications as to details of construction and design without departing from the spirit of the invention or the scope of the following claims.

We claim:

1. The method of producing cheese-making curd which comprises introducing within a moving stream of a liquid casein-containing milk food ingredient an enzyme capable of delayed reaction with said milk food ingredient to produce a cheese-making curd-coagulum; subjecting said stream, during continual movement thereof and following the introduction of said enzyme therein, to relatively violent agitation, whereby to disperse said enzyme substantially uniformly throughout said stream; transforming said stream, following agitation thereof, into a relatively quiescent, non-turbulent column of substantially uniform diameter; and causing said column to coagulate during continual axial movement thereof to form therein a cheese-making curd-coagulum.

2. The method of producing cheese-making curd which comprises introducing rennin within a continuous longitudinally moving stream of a casein-containing liquid; mixing said casein-containing liquid and rennin during continued flow of the stream to obtain homogeneity between the rennin and casein-containing liquid; and thereafter causing the casein-containing liquid and admixed rennin to move in a substantially internally quiescent, non-turbulent column during reaction of the rennin with said casein-containing liquid, whereby to form in said column a cheese-making curd-coagulum.

3. The method of producing cheese-making curd which comprises forming a continuously moving stream of casein-containing liquid; continuously injecting into said stream of casein-containing liquid metered quantities of a casein-coagulating enzyme and a bacterial starter; subjecting said stream, enzyme and starter during continued movement thereof to generally rotary agitation to obtain substantially homogeneous dispersion of the enzyme and starter throughout said casein-containing liquid; and thereafter causing the casein-containing liquid and admixed enzyme and starter to move in a substantially internally quiescent, non-turbulent column while undergoing coagulation, whereby to form in said column a cheese-making curd-coagulum.

4. The method of producing cheese-making curd which comprises forming a continuously moving stream of casein-containing liquid; continuously injecting into said stream of casein-containing liquid metered quantities of a casein-coagulating enzyme and a bacterial starter; subjecting said stream, enzyme and starter during continued movement thereof to generally rotary agitation to obtain substantially homogeneous dispersion of the enzyme and starter throughout said casein-containing liquid; thereafter causing the casein-containing liquid and admixed enzyme and starter to move in a substantially internally quiescent, non-turbulent column while undergoing coagulation, whereby to form in said column a cheese-making curd-coagulum; and cutting said column during axial movement thereof to divide said coagulum into separate, relatively smaller curd particles.

5. A method for the continuous manufacture of cheese-making curd which comprises injecting metered quantities of rennin into a confined continuously moving stream of a casein-containing milk food; subjecting said stream, following the injection of rennin therein to internal turbulence-producing forces to disperse the rennin, substantially uniformly throughout the stream; causing said stream to progressively expand in diameter to thereby dampen internal turbulence therein; and thereafter causing said stream to flow axially in a substantially non-turbulent column to permit the formation therein of a cheese-making curd coagulum resulting from the chemical reaction of said casein-containing milk food with the rennin injected therein.

6. Apparatus for the continuous production of cheese-making curd comprising pump means operable to discharge a continuously moving stream of casein-containing liquid; means to inject a casein-coagulating enzyme and a bacterial starter into a stream of liquid discharged from said pump; an agitator connected to receive the stream of liquid discharged from said pump and to disperse an enzyme and starter injected therein uniformly throughout the stream; first conduit means in fluid communication with said agitator operable to dampen turbulence created within said stream by operation of said agitator; and a second, generally vertically arranged conduit means in fluid communication with said first conduit means for causing said stream to move axially in a relatively quiescent, non-turbulent column under pressure of said pump, and thereby to permit the formation therein of a cheese-making curd coagulum.

7. Apparatus for the continuous production of cheese-making curd comprising an hydraulic pump having an inlet to receive a liquid, casein-containing milk food and an outlet for discharging said milk food under positive pressure; means communicating with the outlet of said pump for injecting an enzyme and a bacterial starter into the liquid milk food discharged from said pump; agitator means connected to receive the discharge from said pump and from said last-named means and to mix the same, said agitator means having an outlet through which materials mixed therein are discharged; means connected with the outlet of said agitator means and defining therein a generally vertically arranged, inverted cone-shaped chamber; and a generally vertically arranged, elongated conduit of uniform cross-sectional configuration throughout its length connected at its lower end with the larger end of said inverted cone-shaped chamber and having an outlet at its upper end through which cheese-making curd formed in said apparatus may be discharged in a continuous column under pressure of said pump.

8. Apparatus for the continuous production of cheese-making curd comprising an hydraulic pump having an inlet to receive a liquid, casein-containing milk food and an outlet for discharging said milk food under positive pressure; means communicating with the outlet of said pump for injecting an enzyme and a bacterial starter into the liquid milk food discharged from said pump; agitator means connected to receive the discharge from said pump and from said last-named means and to mix the same, said agitator means having an outlet through which materials mixed therein are discharged; means connected with the outlet of said agitator means and defining therein a generally vertically arranged, inverted cone-shaped chamber; a generally vertically arranged, elongated conduit of uniform cross-sectional configuration throughout its length connected at its lower end with the larger end of said inverted cone-shaped chamber and having an outlet at its upper end through which cheese-making curd formed in said apparatus may be discharged in a continuous column under pressure of said pump; and means disposed at the outlet of said conduit for cutting the curd column both longitudinally and transversely to divide said column into individual relatively small curd particles.

9. Apparatus for the continuous production of cheese-making curd comprising fluid-displacing means operable to discharge a continuously moving stream of a liquid, casein-containing milk food; means to inject into a stream discharged by said fluid-displacing means a casein-coagulating enzyme and a bacterial starter; agitator means arranged to receive and mix a stream of liquid discharged from said fluid-displacing means and the enzyme and starter injected therein during continual axial movement of the stream; first conduit means in fluid communication with said agitator means for dampening turbulence created in the liquid through operation of said agitator means; second, generally vertically arranged conduit means connected with said first conduit means to receive liquid therefrom and to conduct the same axially therethrough in a relatively quiescent, non-turbulent column whereby to permit the formation of curd-coagulum and whey in said column during movement thereof as a body through said second conduit means; curd-cutting means associated with said second conduit means for continuously dividing a column of curd-coagulum formed in said second conduit means into separate relatively finely divided curd particles; a pre-cooking chamber having an inlet arranged to receive curd particles and whey from said second conduit means and said curd-cutting means and an outlet to discharge pre-cooked curd particles and liquid whey therefrom; means to convey curd particles and liquid whey through said pre-cooking chamber; separator means disposed at the outlet of said pre-cooking chamber for separating curd particles from whey and for discharging the separated curd particles therefrom; generally vertically arranged cooking and washing chamber means disposed to receive at the upper end thereof curd particles discharged from said separator means and permit the same to fall downwardly by gravity through said chamber means; and means in said chamber means to first heat curd particles falling therethrough and thereafter spray the curd particles with water to wash the same.

References Cited in the file of this patent
UNITED STATES PATENTS

| | | |
|---|---|---|
| 1,159,808 | Spencer et al. | Nov. 9, 1915 |
| 2,016,612 | Nilsson | Oct. 8, 1935 |